United States Patent
Moretti Polegato et al.

(10) Patent No.: US 11,712,077 B2
(45) Date of Patent: Aug. 1, 2023

(54) THREE-DIMENSIONAL CHANNELED FABRIC STRUCTURE FOR GARMENTS AND/OR FOOTWEAR

(71) Applicant: MMI-IPCO, LLC, Lawrence, MA (US)

(72) Inventors: Mario Moretti Polegato, Crocetta del Montello (IT); Mirco Bergamin, Castelfranco Veneto (IT); Christian Marcon, Povegliano (IT); Gadalia Vainer, Melrose, MA (US); William Michael Rose, East Hampstead, NH (US)

(73) Assignee: Milliken & Company, Spartanburg, SC (US)

( * ) Notice: Subject to any disclaimer, the term of this patent is extended or adjusted under 35 U.S.C. 154(b) by 573 days.

(21) Appl. No.: 15/771,939

(22) PCT Filed: Oct. 31, 2016

(86) PCT No.: PCT/US2016/059714
§ 371 (c)(1),
(2) Date: Apr. 27, 2018

(87) PCT Pub. No.: WO2017/075587
PCT Pub. Date: May 4, 2017

(65) Prior Publication Data
US 2018/0338563 A1    Nov. 29, 2018

Related U.S. Application Data

(60) Provisional application No. 62/262,178, filed on Dec. 2, 2015, provisional application No. 62/248,530, filed on Oct. 30, 2015.

(51) Int. Cl.
*D04B 1/24* (2006.01)
*D04B 21/20* (2006.01)
(Continued)

(52) U.S. Cl.
CPC .......... *A41D 31/102* (2019.02); *A41D 27/28* (2013.01); *A41D 31/125* (2019.02);
(Continued)

(58) Field of Classification Search
CPC ...... D10B 2403/0121; D10B 2403/033; D10B 2501/043; D10B 2403/0331;
(Continued)

(56) References Cited

U.S. PATENT DOCUMENTS

| 4,439,476 A | 3/1984 | Guild |
| 5,455,110 A | 10/1995 | Connor |

(Continued)

FOREIGN PATENT DOCUMENTS

| CN | 101404903 A | 4/2009 |
| DE | 93 02 039 U1 | 4/1993 |

(Continued)

OTHER PUBLICATIONS

Song, "Thermal Insulation Properties of Textiles and Clothing", Woodhead Publishing (Year: 2009).*
(Continued)

*Primary Examiner* — Jennifer A Steele
(74) *Attorney, Agent, or Firm* — Cheryl J. Brickey

(57) ABSTRACT

A fabric structure includes a first layer, a second layer, and a spacing layer that interconnects the first layer and the second layer, wherein, the interconnecting of the first layer, second layer, and third layer forms a plurality of channels.

8 Claims, 8 Drawing Sheets

(51) Int. Cl.
| | |
|---|---|
| *A41D 31/102* | (2019.01) |
| *B32B 5/26* | (2006.01) |
| *A43B 1/04* | (2022.01) |
| *A43B 23/02* | (2006.01) |
| *B32B 5/22* | (2006.01) |
| *B32B 5/24* | (2006.01) |
| *A43B 7/06* | (2006.01) |
| *A41D 31/12* | (2019.01) |
| *A41D 31/14* | (2019.01) |
| *A41D 31/18* | (2019.01) |
| *A43B 7/08* | (2022.01) |
| *A41D 27/28* | (2006.01) |
| *B32B 5/02* | (2006.01) |

(52) U.S. Cl.
CPC ......... *A41D 31/145* (2019.02); *A41D 31/185* (2019.02); *A43B 1/04* (2013.01); *A43B 7/06* (2013.01); *A43B 7/08* (2013.01); *A43B 23/0265* (2013.01); *B32B 5/026* (2013.01); *B32B 5/22* (2013.01); *B32B 5/24* (2013.01); *B32B 5/26* (2013.01); *D04B 1/24* (2013.01); *D04B 21/207* (2013.01); *A41D 2500/10* (2013.01); *B32B 2262/0261* (2013.01); *B32B 2262/0276* (2013.01); *B32B 2307/73* (2013.01); *B32B 2437/02* (2013.01); *D10B 2403/0331* (2013.01); *D10B 2501/043* (2013.01)

(58) Field of Classification Search
CPC ........... Y10T 442/40; A43B 7/08; A43B 7/06; A43B 23/0265; A43B 1/04; A41D 31/145; A41D 31/125; A41D 27/28; A41D 31/02; A41D 2500/10; B32B 5/026
See application file for complete search history.

(56) References Cited

U.S. PATENT DOCUMENTS

| | | | |
|---|---|---|---|
| 5,783,277 A * | 7/1998 | Rock .................. | B32B 5/26 428/95 |
| 5,855,125 A | 1/1999 | Lohmueller et al. | |
| 5,896,758 A * | 4/1999 | Rock .................. | A43B 1/04 66/191 |
| 8,088,698 B2 | 1/2012 | Polegato Moretti | |
| 2003/0106346 A1 | 6/2003 | Matsumoto | |
| 2005/0075027 A1* | 4/2005 | Etchells ............. | A43B 1/0045 442/205 |
| 2009/0104404 A1* | 4/2009 | Polegato Moretti ................ | A41D 31/125 428/137 |
| 2012/0288662 A1 | 11/2012 | Conolly | |
| 2014/0310986 A1 | 10/2014 | Tamm et al. | |

FOREIGN PATENT DOCUMENTS

| | | | |
|---|---|---|---|
| EP | 1 052 319 A1 | 11/2000 | |
| GB | 2353048 | * 4/1999 | ............ D04B 21/02 |

OTHER PUBLICATIONS

International Search Report and Written Opinion dated Dec. 30, 2016 in PCT/US2016/059714 (13 pages).
The Extended European Search Report dated Nov. 11, 2019 in corresponding EP Patent Application No. 16861040.0 (12 pages).
Office Action issued for corresponding Chinese Application No. 201680063716.3 dated Jun. 10, 2020 (15 pages).

* cited by examiner

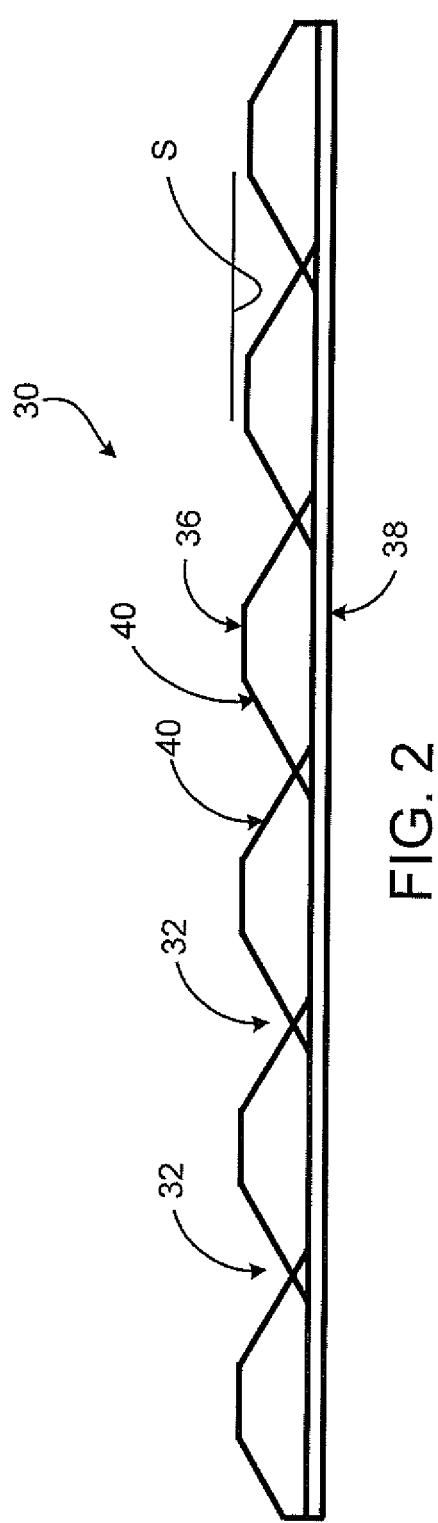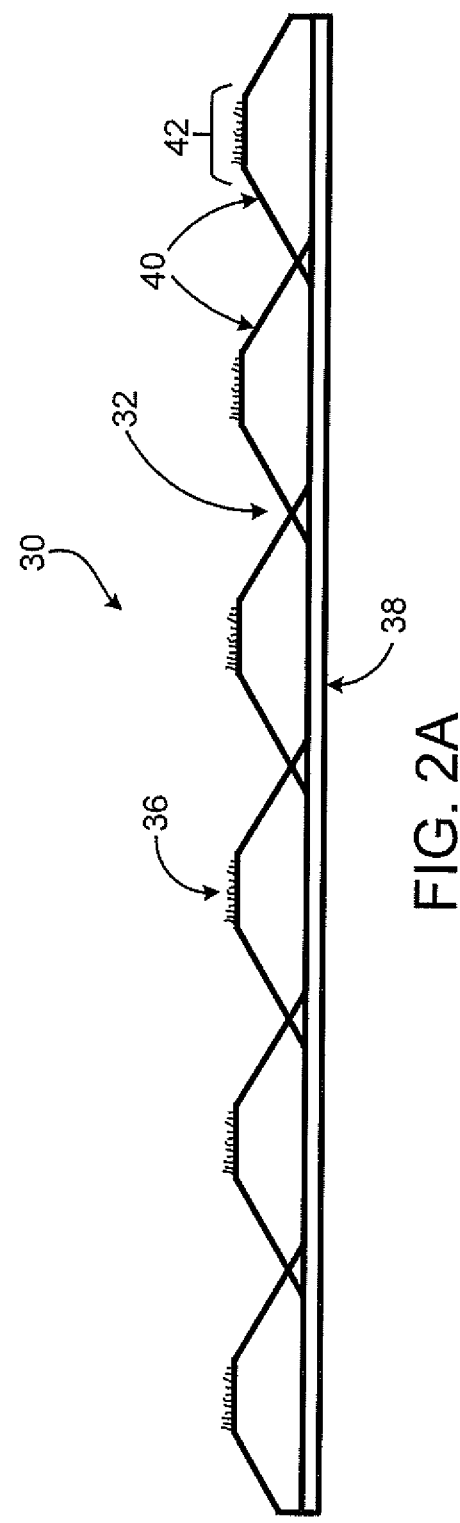

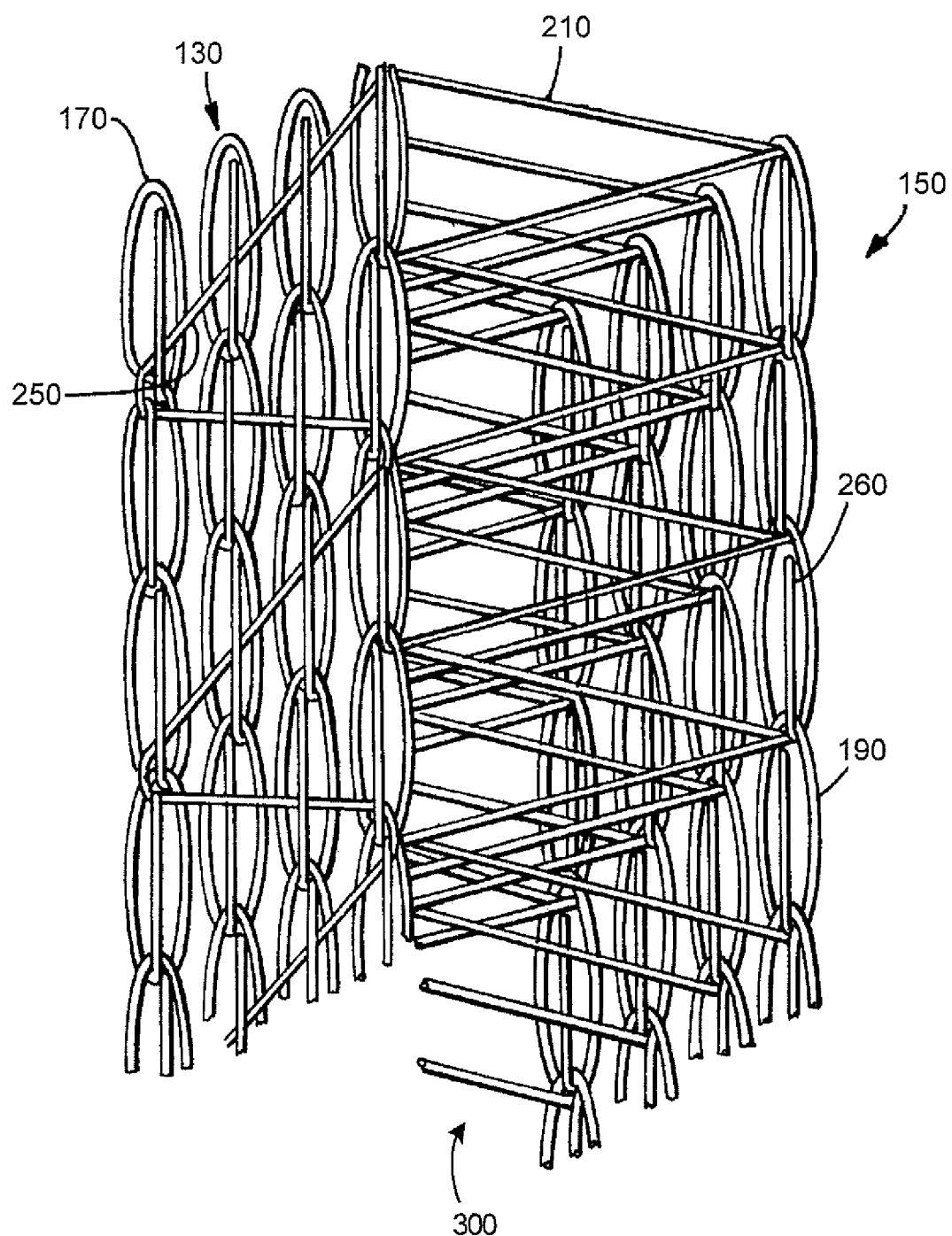
FIG. 7 - Prior Art

THREE-DIMENSIONAL CHANNELED FABRIC STRUCTURE FOR GARMENTS AND/OR FOOTWEAR

CROSS REFERENCE TO RELATED APPLICATION

This application is a 35 U.S.C. 371 National Phase Entry Application from PCT/US2016/059714, filed Oct. 31, 2016, which claims priority to U.S. Patent Provisional Application Nos. 62/248,530, filed Oct. 30, 2015 and 62/262,178, filed Dec. 2, 2015, the disclosures of which are incorporated herein in their entirety by reference, and priority is claimed to each of the foregoing.

TECHNICAL FIELD

This disclosure relates to a fabric structure such as a three-dimensional knit or woven spacer fabric, e.g. for footwear and outerwear.

BACKGROUND

Prior art footwear and outerwear spacer fabrics have generally been comprised of a non-integrated, composite fabric with a laminate applied thereto, the laminate acting as a moisture barrier, hindering transport and evaporation of moisture. Such prior art spacer fabrics designed for footwear and outerwear generally do not allow an air flow effect for movement of moisture and improvement of the comfort in the fabric. These spacer fabrics often act as a moisture barrier, hindering transport and evaporation of moisture. Accordingly, it is desirable to provide a fabric which overcomes the above disadvantages.

Furthermore, people today wear garments and footwear in order to protect parts of their body against the elements of the weather, such as snow, rain, wind, and especially cold, achieving a condition of "thermal comfort" which is defined by the standard ISO 7730 as being "that condition of mind which expresses satisfaction with the thermal environment." The human being has a system of thermal regulation which allows him to maintain the internal temperature of his body constant at a value substantially equal to 37° C.

When the body's internal temperature rises above 37° C., there is at first a dilatation of the blood vessels, increasing the blood flow in the skin, and then one begins to sweat. Sweating involves a lowering of the body temperature, since the energy used by the sweat in evaporation is taken away from the skin, a rise in the internal temperature by a few tenths of a degree can therefore stimulate sweating which quadruples the dissipation of energy by the body. When the internal temperature of the body is less than 34° C., there is at first a vasoconstriction which reduces the blood flow in the skin and then increases the generation of energy inside the body, which acts on the muscles and causes a feeling of a chill in the person.

The two principal groups of sensors of the control system regulating the body temperature are located in the skin and in the hypothalamus of the human body: (i) the sensor located in the hypothalamus is activated in conditions of warmth, or when the internal temperature rises beyond 37° C.; and (ii) the sensors located in the skin are activated in conditions of cold, or when the temperature of the skin falls below 34° C. If both types of sensors are active, the brain inhibits one or both of the defensive reactions.

It is known that people wear garments and footwear which are made with fabrics able to protect the parts of their bodies against sudden thermal changes. The parameters associated with the characteristics of clothing are expressed by the parameter "CLO" which measures the thermal resistance due to clothing (clothing resistance). A single CLO corresponds to 0.155 $m^2K/W$.

The standard indicating the values of CLO based on the type of clothing is ISO 7730: according to this standard, the scale of CLO is structured such that a naked person has a thermal resistance equal to 0 CLO, while indoor wear corresponds to a thermal resistance equal to 1.0 CLO. Consequently, for summer wear, it is advisable to have clothing having a thermal resistance between (0.50-1.20) CLO, while for winter wear, it is advisable to have clothing having a thermal resistance between (0.94-2.44) CLO.

It is known today how to make garments which enable an adequate thermal regulation for the body of the wearer. For this purpose, the patent EP1194049 is known, which illustrates a solution for obtaining garments which allow an effective breathability and dissipation of vapor; such a solution calls for the use of first access holes to an interspace present in the garment, so as to transfer the sweat in vapor phase, and the use of second holes for evacuation of the vapor, being channeled in the interspace, the first access holes and the second evacuation holes being combined with means of retention which keep out water and impurities. Such a solution has drawbacks: in fact, there is a high cost of production and assembly due to the structural complexity of the garment and the end product obtained with this known technique proves to be heavy and rigid.

There is also known at present the patent EP1266584 in which is claimed a multilayered fabric comprising an internal layer and an external layer, both made of a material able to distribute sweat, and an intermediate layer made of a material able to transfer the condensed sweat from the garment to the outside. Such a solution has the following drawback: the external layer proves to be hydrophilic, thus not allowing a continual and linear evacuation of the vapor to the outside and consequently producing a condensation inside the garment.

In order to overcome this drawback, the patent EP2007235 has been filed, in which a multilayered fabric is disclosed having: a first hydrophobic and breathable layer, disposed in a way that is channeled toward the wearer, which removes the sweat in the liquid phase and in the vapor phase from the wearer; a second hydrophobic intermediate layer which transfers the sweat in the liquid phase from the first internal layer to the third external layer and transfers the sweat in the vapor phase from the first internal layer to the outside; and a third hydrophilic external layer, which encourages the evaporation of the sweat to the outside.

This multilayered fabric is formed on warp-weft machines: the threads of the second layer are interwoven in the strips of the first layer and in the third layer. The type of fabrics just described does not allow a subsequent working of the layers with operations which increase the thermal insulation.

With regard to this latter issue, the patents EP0979893B1, EP0756030B1, EP1369515B1, EP1586684B1 and EP1586685B1 are known; the knitted fabrics described in this prior art, while able to be worked to increase the thermal insulation, do not allow a transfer of sweat in the liquid phase from the internal face of the garment to the outside (transverse breathability) or a defining of a passage for the sweat in vapor phase from the first internal layer to the outside (longitudinal breathability). Since these fabrics are always in contact with the body of the wearer, the thermal insulation effect prevails over that of air exchange (ventilation) so that the passage of sweat in the vapor phase through these fabrics can only occur in a manner transverse to them.

SUMMARY

One aspect of the disclosure is directed to a three-dimensional knit spacer fabric comprising a first fabric layer made from a first stitch yarn and a first backing yarn, a second fabric layer made from a second stitch yarn and a second backing yarn, and adjacent ranks of resilient pile yarns, disposed at non-parallel angles, interconnecting while resiliently spacing and supporting the first and second fabric layers, the first fabric layer defining an exposed surface, with the exposed surface defining multiple three-dimensional channels for movement of air there along.

Implementations of this aspect of the disclosure may include one or more of the following additional features. The first fabric layer has a surface with yarn fibers that are napped. The second fabric layer has a surface with yarn fibers that are napped. The pile yarns have sufficient resilience and stiffness to keep the first fabric layer and the second fabric layer resiliently spaced apart, even under application of normal pressure. The pile yarns are made from fiber rendered hydrophobic in order to facilitate moisture transport from the first fabric layer toward the second fabric layer. The first fabric layer is rendered hydrophobic, thereby to facilitate transport of moisture. The stitch yarns and the backing yarns of the first fabric layer are polyester and nylon rendered hydrophobic, thereby to enhance transport of moisture. The pile yarns are monofilament or multifilament, with fineness between about 40 denier and about 150 denier. Preferably, the pile yarns are multifilament, with individual fiber fineness of between about 2 dpf and about 12 dpf. The second fabric layer is multifilament or monofilament, with high tenacity value for toughness. Preferably, at least one of the first lay-in yarn, the first backing yarn, the second lay-in yarn and the second backing yarn has a tenacity of between about 4 and 12 grams per denier. At least one of the first lay-in yarn and the second lay-in yarn incorporates an elastomeric yarn. Preferably, the elastomeric yarn has fineness between about 70 denier and about 200 denier.

Another aspect of the disclosure is directed to an article of footwear comprising a three-dimensional knit spacer fabric comprising a first fabric layer made from a first stitch yarn and a first backing yarn, a second fabric layer made from a second stitch yarn and a second backing yarn, and adjacent ranks of resilient pile yarns, disposed at non-parallel angles, interconnecting while resiliently spacing and supporting said first and second fabric layers; the first fabric layer defining an exposed surface, the exposed surface defining multiple three-dimensional channels for movement of air there along.

Yet another aspect of the disclosure is directed to an article of outerwear comprising three-dimensional knit spacer fabric comprising: a first fabric layer made from a first stitch yarn and a first backing yarn, a second fabric layer made from a second stitch yarn and a second backing yarn, and adjacent ranks of resilient pile yarns, disposed at non-parallel angles, interconnecting while resiliently spacing and supporting said first and second fabric layers; the first fabric layer defining an exposed surface, the exposed surface defining multiple three-dimensional channels for movement of air there along.

The present disclosure thus relates to a three-dimensional knit spacer fabric with channels, e.g. for use in footwear and outerwear. In particular, the disclosure relates to a three-dimensional knit or woven spacer fabric having the first and second layers spaced from and connected to each other, while the spacer fabric defines channels, especially v-shaped channels, open to the surface, for flow of air.

It is significant that the knit or woven spacer fabric of the disclosure has a special three-dimensional structure, which provides enhanced shape retention, e.g. as compared to prior art spacer fabrics.

Objects of this disclosure include providing an improved three dimensional fabric with improved resilience, e.g. under normal loading. For example, for inventive spacer fabrics intended for use in footwear, a polyester/nylon resilient yarn may be used as an interconnecting yarn, in order to maintain resiliency of the spacer fabric.

According to the present disclosure, the inventive spacer fabric can be provided in a range of thicknesses. This allows construction of the inventive spacer fabric with thickness selected, e.g., to meet different weather conditions and/or thermal insulation requirements.

It is significant that the inventive spacer fabric of the disclosure may be provided with napping of the first (inner) layer and/or the second (outer) layer. This napping will serve to improve thermal levels for the wearer, and it will also provide additional comfort.

Further problems to be solved by the present disclosure are to achieve a fabric structure that may be used for garments and footwear which is ventilated and breathable and which at the same time is able to ensure a state of thermal comfort for the human body, solving the drawbacks mentioned for the fabrics and garments of the known type.

The aim of the present disclosure is to provide a fabric structure which is able to ensure an adequate air exchange, while at the same time preventing a dissipation of the warmth needed to protect the body against cold. Within this aim, an object of the embodiments is to realize a fabric structure which allows a rapid natural thermal regulation of the human body.

Another object of the disclosure is to obtain a fabric structure which guarantees an optimal or improved level of breathability and ventilation. In addition, it is an object to obtain a structure which is structurally simple, having modest production costs and able to be produced with customary or known equipment.

This aim and these indicated objects, as well as others which will appear more clearly below, are achieved by a fabric structure that may be used for garments and footwear. In some embodiments, the fabric includes a first breathable web, able to allow the passage of sweat both in the liquid phase and in the vapor phase, a second breathable web, constituted of a continuous fabric layer, and a third spacing web, sandwiched between the first and second web, having a plurality of channels alternating with a plurality of ribs substantially parallel with the channels.

According to some embodiments, a fabric structure includes a first layer, a second layer, and a spacing layer that interconnects the first layer and the second layer, wherein, the interconnecting of the first layer, second layer, and third layer forms a plurality of channels.

In some embodiments, (i) the fabric structure is a three-dimensional knit spacer fabric, (ii) the first layer is a first fabric layer made from a first stitch yarn and a first backing yarn, (iii) the second layer is a second fabric layer made from a second stitch yarn and a second backing yarn, the spacing layer is formed of adjacent ranks of resilient pile yarns, disposed at non-parallel angles, with respect to one another, between the first layer and the second layer, the adjacent ranks of resilient pile yarns interconnecting the first layer and the second layer while resiliently spacing and supporting the first layer and the second layer, (iii) the first fabric layer defines an exposed surface, and (iv) the plurality of channels are three-dimensional channels for movement of air there along.

In some embodiments, the first fabric layer has a surface with yarn fibers that are napped.

In some embodiments, the second fabric layer has a surface with yarn fibers that are napped.

In some embodiments, the pile yarns have sufficient resilience and stiffness to keep the first fabric layer and the second fabric layer resiliently spaced apart, even under application of normal pressure.

In some embodiments, the pile yarns are made from fiber rendered hydrophobic in order to facilitate moisture transport from the first fabric layer toward the second fabric layer.

In some embodiments, the first fabric layer is rendered hydrophobic, thereby to facilitate transport of moisture.

In some embodiments, the stitch yarns and the backing yarns of the first fabric layer are polyester and nylon rendered hydrophobic, thereby to enhance transport of moisture.

In some embodiments, the pile yarns are monofilament or multifilament, with fineness between about 40 denier and about 150 denier.

In some embodiments, the pile yarns are multifilament, with individual fiber fineness of between about 2 dpf and about 12 dpf.

In some embodiments, the second fabric layer is multifilament or monofilament, with a high tenacity value for toughness.

In some embodiments, at least one of the first lay-in yarn, the first backing yarn, the second lay-in yarn and the second backing yarn has a tenacity of between about 4 and 12 grams per denier.

In some embodiments, at least one of the first lay-in yarn and the second lay-in yarn incorporates an elastomeric yarn.

In some embodiments, the elastomeric yarn has fineness between about 70 denier and about 200 denier.

In some embodiments, (i) the first layer is a first breathable web that is configured to direct the passage of sweat both in the liquid phase and in the vapor phase, (ii) the second layer is a second breathable web that includes a continuous fabric layer, (iii) the spacing layer is a third spacing web disposed between the first and the second web, and the plurality of channels alternate with a plurality of ribs substantially parallel with them.

In some embodiments, the first web includes a plurality of fabric strips, each of which is associated with a first surface of a corresponding one of the plurality of ribs on the side opposite the second web, and the fabric strips have a width between about 2 and about 6 millimeters and are made as knitwear strips.

In some embodiments, the continuous fabric layer is formed as knitwear and is placed in contact with a second surface of the plurality of ribs facing opposite to the first web.

In some embodiments, a first fleece is developed from a third surface of the continuous layer facing opposite the plurality of ribs, the first fleece configured to hold back air between fibers of the first fleece so as to increase the degree of insulation of the fabric structure.

In some embodiments, a second fleece is obtained from a fourth upper free surface of the plurality of strips of the first web by brushing or napping of the fibers that form the plurality of strips.

In some embodiments, the plurality of channels of the third layer has a substantially "U" cross section, defined on a plane oriented substantially perpendicular to the plurality of ribs, the plurality of channels has a width between 2 and 8 millimeters, and the plurality of channels configured to allow the transfer of warm humid air and/or sweat along the fabric structure and toward the outside.

In some embodiments, the plurality of ribs has a substantially trapezoidal cross section defined on a plane oriented substantially perpendicular to the plurality of ribs, and the plurality of ribs has a thickness between about 2 and about 4 millimeters.

In some embodiments, a first fleece is obtained by brushing or napping of the fibers that form the continuous layer of the second breathable web.

In some embodiments, the first web is constituted of a continuous fabric layer and a second fleece obtained by brushing or napping of the fibers making up the continuous layer of the first web.

In some embodiments, the plurality of channels of the third web has a substantially quadrangular cross section defined on a plane oriented substantially perpendicular to the plurality of ribs, the plurality of channels has a width between 2 and 8 millimeters, and the plurality of channels is configured to allow the transfer of warm humid air and/or sweat along the fabric structure and toward an outside of a garment or article of footwear that incorporates the fabric structure.

In some embodiments, at least a portion of the pile yarns of the adjacent ranks of resilient pile yarns, disposed at non-parallel angles, with respect to one another form a least a portion of the three-dimensional channels.

In some embodiments, the three-dimensional channels are v-shaped channels.

According to some embodiments, an article of footwear comprising a fabric structure includes a first layer configured to direct movement of air, a second layer, and a spacing layer that interconnects the first layer and the second layer, wherein, the interconnecting of the first layer, second layer, and third layer forms a plurality of channels.

In some embodiments, (i) the fabric structure is a three-dimensional knit spacer fabric, (ii) the first layer is a first fabric layer made from a first stitch yarn and a first backing yarn, (iii) the second layer is a second fabric layer made from a second stitch yarn and a second backing yarn, (iv) the spacing layer is formed of adjacent ranks of resilient pile yarns, disposed at non-parallel angles, interconnecting while resiliently spacing and supporting the first and second fabric layers, (v) the first fabric layer defines an exposed surface, and (vi) the plurality of channels are three-dimensional channels for movement of air there along.

In some embodiments, (i) the first layer is a first breathable web that is configured to direct the passage of sweat both in the liquid phase and in the vapor phase, (ii) the second layer is a second breathable web that includes a continuous fabric layer, (iii) the spacing layer is a third spacing web disposed between the first and the second web, and the plurality of channels alternate with a plurality of ribs substantially parallel with them.

According to some embodiments, an article of outerwear comprising a fabric structure includes a first layer configured to direct movement of air, a second layer, and a spacing layer that interconnects the first layer and the second layer, wherein, the interconnecting of the first layer, second layer, and third layer forms a plurality of channels.

In some embodiments, (i) the fabric structure is a three-dimensional knit spacer fabric, (ii) the first layer is a first fabric layer made from a first stitch yarn and a first backing yarn, (iii) the second layer is a second fabric layer made from a second stitch yarn and a second backing yarn, (iv) the spacing layer is formed of adjacent ranks of resilient pile yarns, (v) disposed at non-parallel angles, interconnecting while resiliently spacing and supporting the first and second fabric layers, (vi) the first fabric layer defines an exposed surface, and (vii) the plurality of channels are three-dimensional channels for movement of air there along.

In some embodiments, (i) the first layer is a first breathable web that is configured to direct the passage of sweat both in the liquid phase and in the vapor phase, (ii) the second layer is a second breathable web that includes a continuous fabric layer, (iii) the spacing layer is a third spacing web disposed between the first and the second web, and (iv) the plurality of channels alternate with a plurality of ribs substantially parallel with them.

The details of one or more implementations of the disclosure are set forth in the accompanying drawings and the description below. Other features, objects, and advantages of the disclosure will be apparent from the description and drawings, and from the claims.

DESCRIPTION OF DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

Further characteristics and advantages of the embodiments will become apparent from the description of preferred, but non-limiting, examples of embodiments of the fabric according to the embodiments, illustrated by way of non-limiting examples in the accompanying drawings, wherein:

FIG. 1 is a side elevational representation and FIG. 2 is a side representation of a first implementation of the inventive three-dimensional, channeled spacer fabric with loop structure made in accordance with the present disclosure, with the faces of both the top and bottom fabric layers unnapped; and FIGS. 2A, 2B and 2C are side representations of other implementations of the inventive spacer fabric of FIGS. 1 and 2, respectively showing a spacer fabric with napping of the face of the top (inner) fabric layer only (FIG. 2A), showing the spacer fabric with napping of the face of the bottom (outer) fabric layer only (FIG. 2B), and showing the spacer fabric with napping of the faces of both the top and bottom fabric layers (FIG. 2C).

FIG. 7 is a side elevational representation of the structure of a prior art spacer fabric.

Like reference symbols in the various drawings indicate like elements.

DETAILED DESCRIPTION

Figure 1:
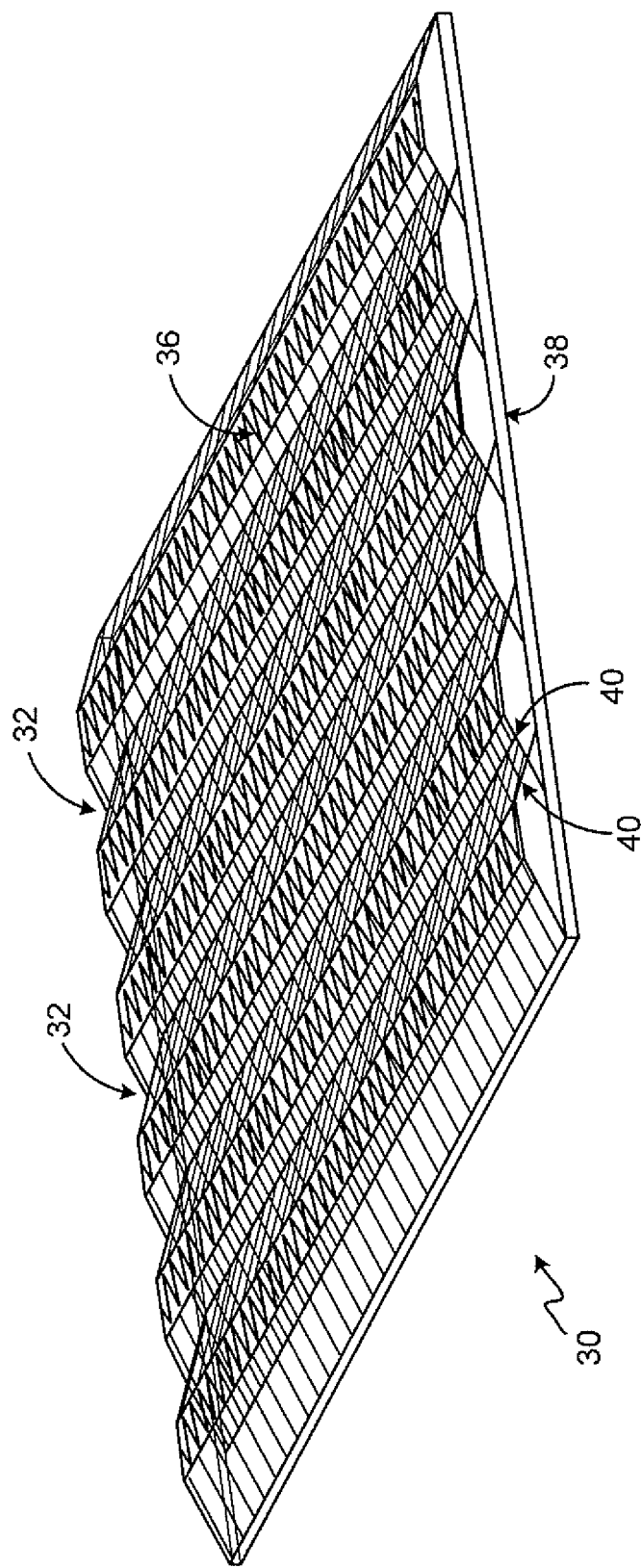

In the following embodiment examples, individual characteristics given in regard to specific examples can in fact be interchanged with other different characteristics existing in other embodiment or examples.

Referring to FIG. 7, a prior art spacer fabric 300, e.g. as described in U.S. Pat. No. 6,156,406, which is assigned to MMI-IPCO, LLC, and the complete disclosure of which is incorporated herein by reference, includes a first fabric layer 130 made from stitch yarn 170, a second fabric layer 150 made from stitch yarn 190, and pile yarn 210 interconnecting the two layers. In addition, knit spacer fabric 110 includes backing or lay-in yarns 250 and 260 which are held by stitch yarns 170 and 190, respectively, as shown.

The disclosed embodiments relate to three dimensional fabric structures. Three-dimensional fabrics can be obtained with 2D or 3D type weaving processes, or any other process known to one of ordinary skill in the art. In particular, by way of example, in the process of producing a textile of 3D type, the sets of fibers X, of horizontal weft, and of fibers Y, of vertical weft, are interwoven with the rows and columns of the sets of axial fibers Z, corresponding to the multilayered warp set.

Alternatively, to the warp-weft weaving, the three-dimensional fabrics can also be obtained by warp knit fabric or weft knit fabric processes, in which the movement of the needles of a knitting machine enables the interweaving of threads in the three spatial dimensions.

In some embodiments, the three-dimensional fabrics are preferably formed by two or more layers, having a variable spacing between the fibers, and they have elevated properties of absorption of kinetic energy, resilience, and shape recovery, and they enable an air flow within the structure, both transversely and longitudinally.

Figure 2B:
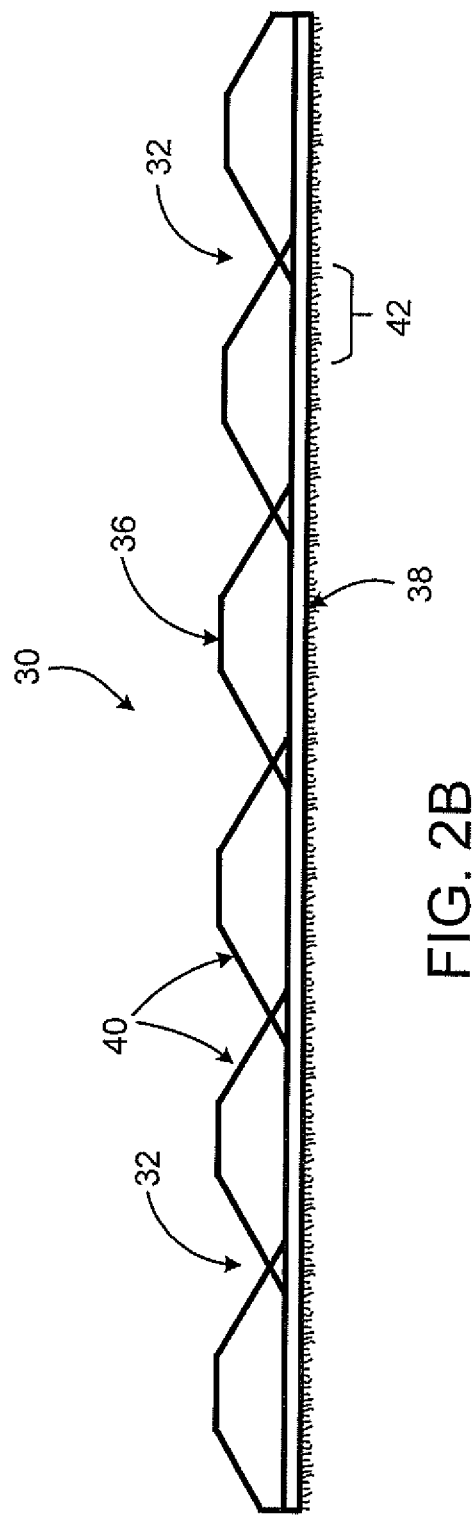
Figure 2C:
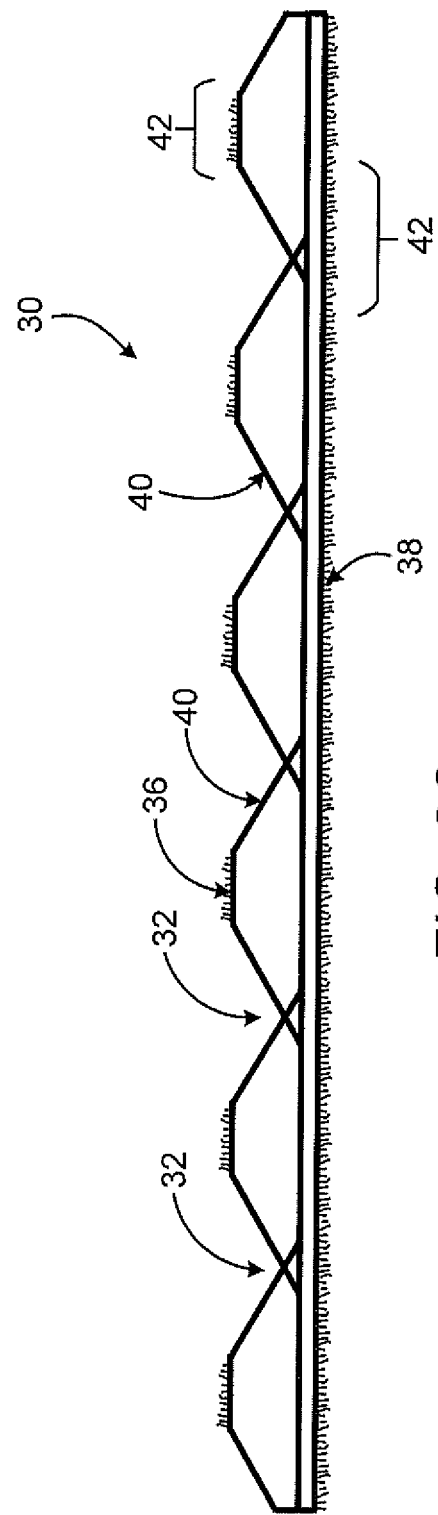

Some embodiments include a three-dimensional knit or woven spacer fabric, e.g. for footwear and outerwear, and more particularly, to a three-dimensional knit or woven spacer fabric having first and second fabric layers spaced from, and connected to, each other. Referring now to FIGS. 1 and 2, and also to FIGS. 2A through 2C, in some implementations of the present disclosure, an integrated composite three-dimensional knit spacer fabric 30 with v-shaped channels 32 open at one surface, e.g. the top/inner surface 36, is provided. The inventive spacer fabric 30 of the disclosure may be prepared, e.g., by knitting a three-dimensional knit fabric on a double-needle bar warp knitting machine commonly used in the manufacture of velvet, and well known in the art. The fabric 30 includes a first (inner) fabric layer 36, a second (outer) fabric layer 38 and a resilient yarn 40 interconnecting the two layers in a spaced relationship. Segments of adjacent ranks of the resilient yarns 40 interconnecting the two layers 36, 38 are disposed at non-parallel angles between the two layers, with the result of forming a generally v-shaped channel 32 open at the front (inner) surface, with the channeling having the effect of creating relatively improved circulation and flow of air and moisture, e.g. from a wearer's adjacent skin surface (S), indicated in FIG. 2.

The integrated composite three-dimensional knit spacer fabric 30 has a special three-dimensional structure that serves to enhance shape retention, in particular of the special v-shaped channeling 32, with resilience sufficient to resist crushing during normal use, e.g. for enhanced air circulation. The thickness, T, of the spacer fabric 30 can also be selected, e.g. to meet the requirements for use in different weather conditions and/or to meet different thermal insulation requirements. Selection of polyester/nylon resilient yarn for use as the interconnecting 40 yarn also contributes to resiliency of the inventive spacer fabric 30.

In some implementations, the first (inner) layer 36 or the second (outer) layer 38 may be raised or provided with napping 42, e.g., for improved thermal levels and addition comfort for the user. In other implementations, both the first (inner) and second (outer) layers 36, 38 may be napped.

In preparing the three-dimensional knit fabric of the disclosure, the yarn is preferably a synthetic material, e.g. such as polyester, acrylic or nylon. The yarn may be filament or spun, textured or fully oriented.

The yarn 40 interconnecting the two layers 36, 38 of the three-dimensional knit spacer fabric 30 of this disclosure is selected to have resilience and stiffness, e.g. sufficient to keep the two fabric layers apart when normal pressure of use is applied to either one of the fabric layers. In construction, the interconnecting pile yarn 40 may be formed of the same materials as the two fabric layers, or it may be formed of different materials. Particularly, in order to render the interconnecting pile yarn 40 resilient, the yarn may be made of a resilient material, e.g. such as monofilament or multifilament polyester, nylon, or other suitable material, such as those known for use in the industry.

The inventive spacer fabric 30 with three-dimensional v-shaped channels 32 is designed to facilitate moisture transport away from the wearer's body, while maintaining a comfortable top (inner) layer 36 and air circulation next to the skin, S, e.g. along the v-shaped channels 32 open at the surface. Top (inner) layer 36 is made from fibers rendered hydrophobic to facilitate transport of moisture, e.g. sweat, through the spacer fabric 30, thus assisting to keep the surface 36 of the inventive spacer fabric dry.

In particular, first (inner) fabric or top (back) layer 36 is made from a stitch yarn having a fineness of between 40 and 200 denier with an individual fiber fineness in the range of between 0.3 and 2.5 dpf. The backing or lay-in yarn of top layer 36 will typically be multifilament, having a fineness of between 70 and 200 denier, with an individual fiber fineness of 0.5 to 5 dpf.

Preferably, the stitch yarn and backing yarn of first (inner) fabric layer 36 are formed of polyester or nylon that has been rendered hydrophobic in order to enhance the transport of perspiration and thereby maintain the skin surface dry. By using a chemically modified fiber or by chemically treating layer 36, the layer is rendered substantially hydrophobic. As a result, the transport of perspiration from the surface, especially if the yarn fibers of layer 36 are raised or napped, as described below, is substantially enhanced, causing liquid moisture to be made readily transportable along the surface of the yarn fibers of layer 36.

Preferably, the surface of fabric layer 36 is sanded, brushed or otherwise napped and thus comprises a raised or napped surface fabric, with each fiber end being a conductor of moisture. Thus, fabric layer 36 will include a plurality of fibers for conducting perspiration therealong from the skin of the wearer, and eventually to second fabric layer 38, from where it is evaporated.

Pile yarns 40, which interconnect the two layers, may be a monofilament or multifilament yarn having a fineness of between 40 and 300 denier, with an individual fiber fineness of 2 to 12 dpf when multifilament. It is preferred, however, that the pile yarn 40 be multifilament in order to increase resilience. The pile yarn 40 is made from fiber rendered hydrophobic in order to facilitate the transport of moisture from top layer 36 to bottom layer 38. Moreover, in addition to forming the three-dimensional v-shaped channel 32 for flow of air along the surface of the inventive spacer fabric 30, each of pile yarns 40 may also be sufficiently spaced from one another to allow air flow throughout the inventive spacer fabric 30. This improves cushioning, ventilation and moisture vapor transmission, as well as providing for physical protection from objects such as pebbles.

Outside or back fabric layer 38 is made from stitch yarn having a fineness of 70 to 300 denier with an individual fiber fineness of 3.0 to 12 dpf. The associated backing or lay-in yarn will also have a fineness of from 70 to 300 denier with an individual fiber fineness of 3.0 to 12 dpf.

Both the stitch yarn and the backing yarn of the outside fabric layer 38 will either be, e.g., multifilament or monofilament, with a high tenacity value in order to increase toughness. In particular, each of the stitch and backing yarns will have a tenacity of between about 4 and 12 grams per denier. This level of tenacity improves abrasion, tear and rupture resistance of fabric layer 38.

Optionally, the inventive spacer fabric of the disclosure may incorporate an elastomeric yarn such as LYCRA in the lay-in yarn of one or both of layers 36 and 38, respectively. Such wrap yarn will have a total fineness of between about 70 denier and 200 denier of wrap LYCRA. This will enhance the softness and flexibility of the layers, and the tightness of fit. The elastomeric yarn may also be added to the stitch yarn of each layer 36, 38.

Figure 3:
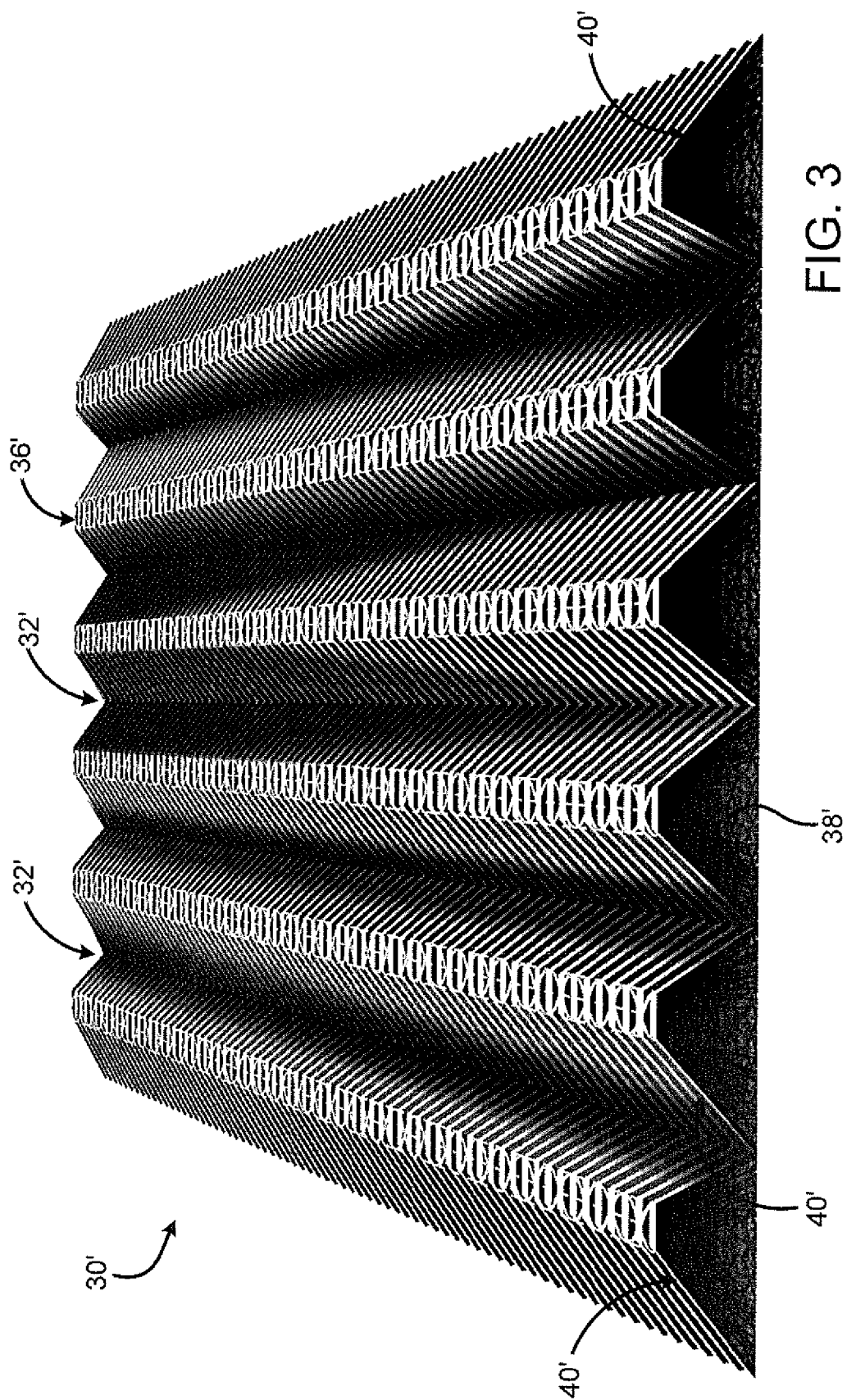
FIG. 3 is a side elevational representation of another implementation of the inventive three-dimensional channeled spacer fabric with loop structure made in accordance with the present disclosure.

FIG. 3 illustrates another implementation of the inventive spacer fabric 30' of the disclosure with a top fabric layer 36' defining three-dimensional v-shaped channels 32' open for flow of air along the top surface, and a bottom fabric layer 38', the top and bottom fabric layers are spaced apart by resilient pile yarns 40'.

In a first example of an inventive spacer fabric of this disclosure having three-dimensional v-shaped channels, e.g. for use in footwear:

The pile yarn (40) is: 2/70/17 nylon p. stretch textured
The stitch yarn is: 70/34 textured, polyester
The backing yarn is: 70/34 textured, polyester A stable construction is provided with special backing knit, and the choice of pile yarn (2/70/17) provides resiliency with definition for the channels. Also, at least the upper (inner) face of the footwear fabric is raised.

In a second example of an inventive spacer fabric of this disclosure having three-dimensional v-shaped channels, e.g. for use in outerwear:

The pile yarn (40) is: 1/150/94 textured polyester, special cross-section.
The stitch yarn is: 70/34 textured polyester.
The backing yarn is: 70/34 textured polyester.

A special construction provides good drape, softness and channel stability. The back (outer) face of the outerwear fabric is raised, and the finished outerwear fabric is treated with hydrophobic finish.

Figure 4:
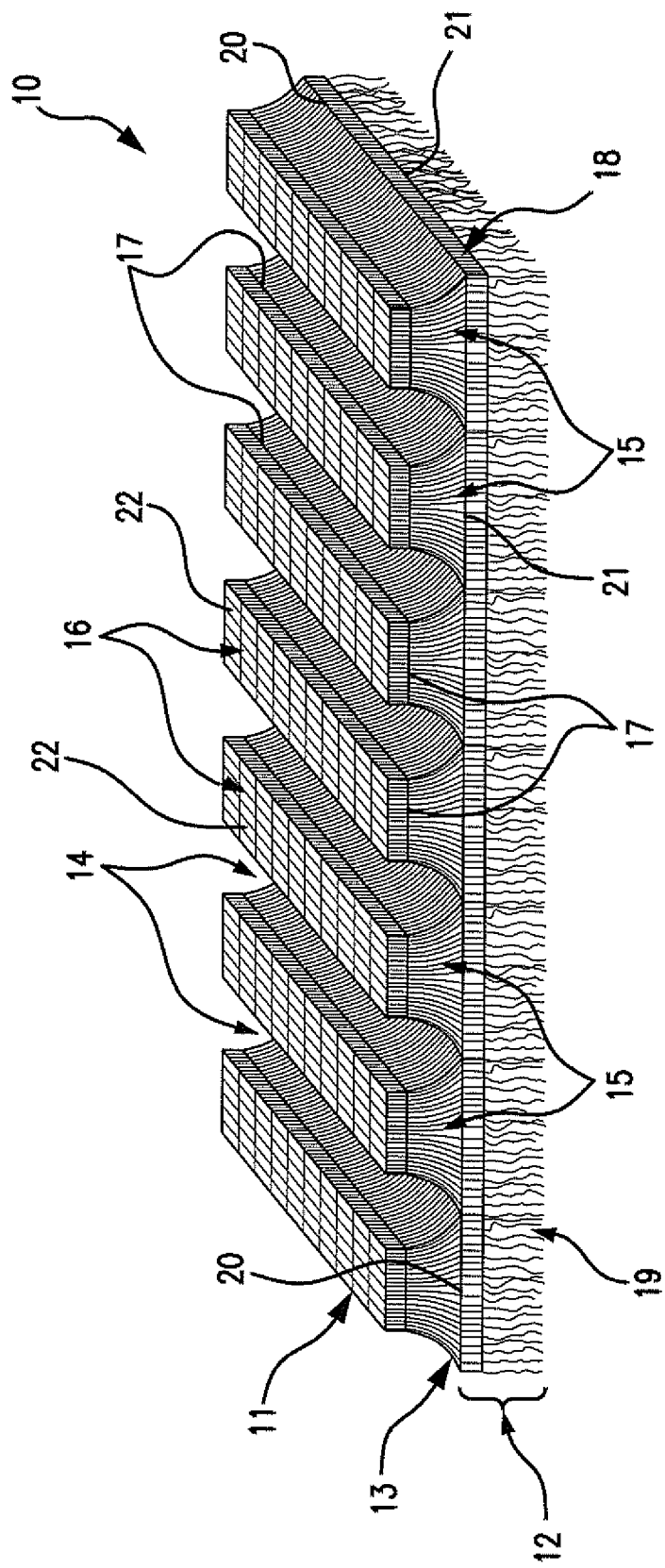
FIG. 4 illustrates a magnified portion of the fabric structure in a perspective view.

FIG. 4 illustrates an embodiment of a fabric structure (10) that may be used for garments and footwear that may be made from a three-dimensional fabric whose fibers are disposed in a mutually perpendicular planar relation.

According to some embodiments, the fabric structure (10) includes a first breathable web (11) able to allow the passage of sweat both in the liquid phase and in the vapor phase, a second breathable web (12), and a third spacing web (13), sandwiched (e.g., disposed) between the first and second web (11, 12), and interconnecting the first and second web (11, 12). The first, second, and third webs define a plurality of channels (14) alternating with a plurality of ribs (15) substantially parallel with them.

In some embodiments, the first web (11) is constituted of a plurality of fabric strips (16), each of which is associated with a first surface (17) of the corresponding one among the plurality of ribs (15), on the side opposite the second web (12).

In some embodiments, the fabric strips (16) of the first web (11) have substantially a width not less than two millimeters and not more than six millimeters, preferably between 3 and 4 millimeters. They are preferably made as knitwear. They are preferably natural fibers of wool and/or cotton, or synthetic fibers of polyester and/or polypropylene and/or polyamide or other similar fibers. As an example, if one of ordinary skill in the art wishes to obtain a more resilient fabric, one can combine fibers of polyester and polyamide, preferably 40% polyester and 60% polyamide.

In some embodiments, the second web (12) is made of a continuous fabric layer (18), preferably made as knitwear. The second web (12) is preferably made of natural fibers of wool and/or cotton, or synthetic fibers of polyester and/or polypropylene and/or polyamide or the like.

In some embodiments, the continuous layer (18) is placed in contact with a second surface (20) of the plurality of ribs (15) facing opposite to the first web (11), while a first fleece (19) is preferably associated with a third surface (21) of the continuous layer (18) facing opposite the plurality of ribs (15), as depicted in FIG. 4.

In some embodiments, the first fleece (19) is obtained by the process of brushing or napping of the fibers making up the continuous layer (18) of the second web (12). The first fleece (19) may be configured to hold back the air between its fibers so as to increase the degree of insulation of the fabric structure (10).

According to some embodiments, the process of brushing or napping can be applied to a fourth free surface of the plurality of strips of the first web, obtaining a second fleece so as to increase the degree of insulation of the fabric structure.

Figure 5:
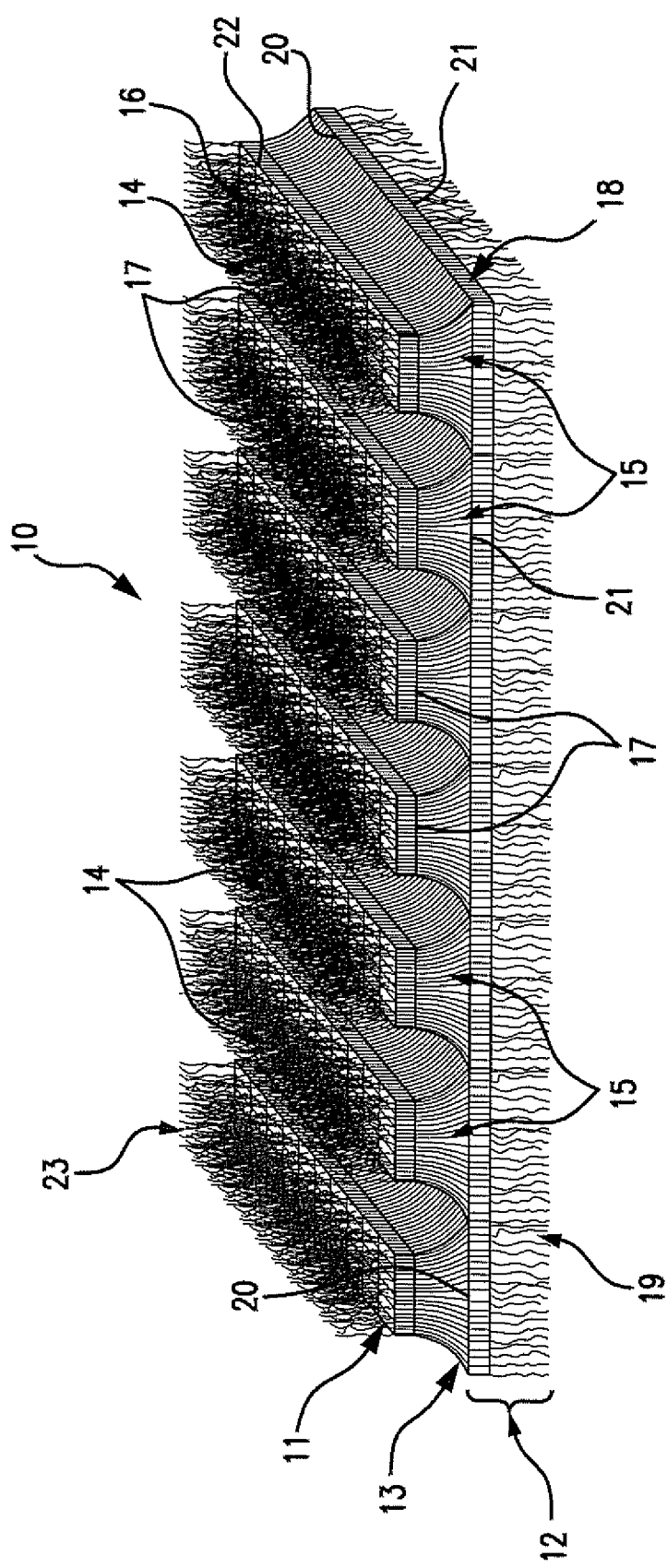
FIG. 5 illustrates, in a perspective view, a magnified portion of the fabric structure in one variant.

Advantageously, as depicted in FIG. 5, the process of brushing or napping can be applied to both a third surface (21) of the continuous layer (18) of the second web (12), facing opposite the plurality of ribs (15), obtaining a first fleece (19) and a fourth free surface (22) of the plurality of strips (16) of the first web (11), obtaining a second fleece (23), for increasing the overall insulation of the fabric structure (10).

In some embodiments, the plurality of channels (14) of the third intermediate layer (13) has a substantially "U" cross section, defined on a plane oriented substantially perpendicular to the plurality of ribs (15). It is to be understood by one of ordinary skill in the art that different shapes or configurations of the ribs and channels are possible. In addition, although the illustrated example has a one to one relationship of the ribs (15) and strips (16), alternate ratios can be used.

In some embodiments, the plurality of channels (14) each have a width between about 2 and about 8 millimeters, preferably about 4 millimeters in the garment industry and about 3 millimeters in the footwear industry. The plurality of channels (14) allow the transfer of warm humid air and/or sweat along the fabric structure and to the outside.

In some embodiments, the plurality of ribs (15) each have a substantially trapezoidal cross section defined on a plane oriented substantially perpendicular to the plurality of ribs (15) in the illustrated example. In some embodiments, the plurality of ribs (15) each have a thickness, for example, not less than about 2 millimeters, preferably between about 3 and 4 millimeters, in order to ensure a comfortable resilience.

Figure 6:
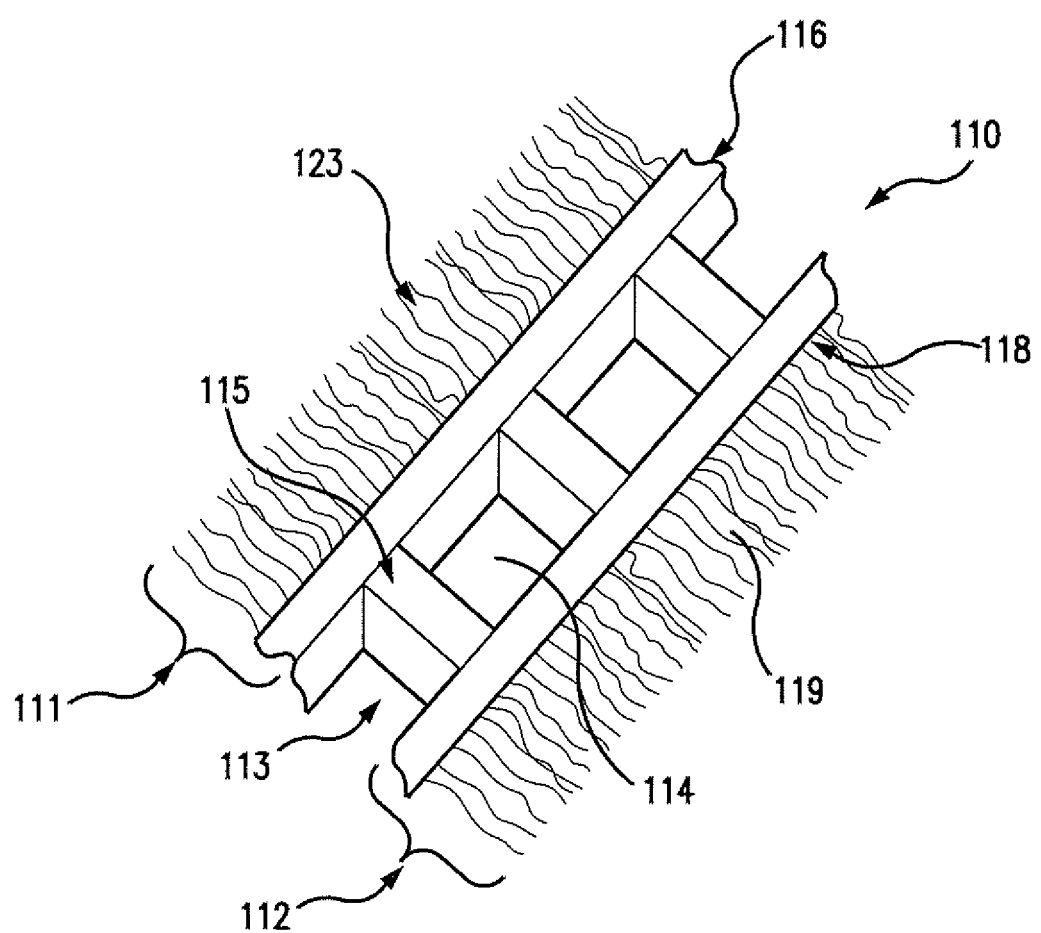
FIG. 6 illustrates, in a perspective view, a magnified portion of the fabric structure in another embodiment.

In another embodiment, shown in FIG. 6, a fabric structure (110) that may be used for garments comprises a first web (111) which includes of a continuous fabric layer (116), preferably made as knitwear. The first web (111) is preferably made of natural fibers of wool and/or cotton, or synthetic fibers of polyester and/or polypropylene and/or polyamide or the like.

In some embodiments, the fabric structure (110) includes a second breathable web (112), made of a continuous fabric layer (118), preferably made as knitwear. The second web is preferably made of natural fibers of wool and/or cotton, or synthetic fibers of polyester and/or polypropylene and/or polyamide or the like and it has a first fleece (119).

In some embodiments, the first web (111) has a second fleece (123) which further increases the insulation of the fabric. The fabric structure has a third spacing web (113), sandwiched (e.g., disposed) between the first and second web (111, 112) and having a plurality of channels (114) alternating with a plurality of ribs (115) substantially parallel to the channels. In some embodiments, the plurality of channels (114) each have a substantially quadrangular cross section defined on a plane oriented substantially perpendicular to the plurality of ribs (115) in the illustrated example. The plurality of channels (114) each may have substantially a width, for example, between about 2 and 8 millimeters, and is able to allow the transfer of warm humid air and/or sweat along the fabric structure (110) and toward the outside.

In a preferred embodiment, the three-dimensional fabric structure (10) is produced on warp knitted fabric machines. The three webs are interwoven with each other to form the fabric structure. In the warp knitted textiles, the threads zig zag in the direction of the length of the fabric, providing greater resistance to the formation of stretch marks.

The degree of thermal insulation of the fabric structure (10) can be regulated by predetermining the length of the fibers making up the first and the second fleece (19, 23). Increasing the length of the fibers increases the thermal insulation of the fabric structure (10), and vice versa.

Thus, it has been found that the embodiments achieve its objects, and provides a fabric structure (10, 110), that may be used for garments and footwear, which is ventilated and breathable, and which is able to ensure a state of thermal comfort for the human body, ensuring an adequate air exchange and at the same time preventing the dissipation of the warmth needed to protect the body against cold.

In addition, the fabric structure (10, 110) is able to provide an easy and rapid natural thermal regulation of the human body. Moreover, the fabric structure (10, 110) is able to ensure an adequate level of breathability and ventilation, such that the wearer can move around more or less strenuously without feeling chilled or sweating within a broad temperature range, feeling a state of thermal comfort even if a rapid and sudden temperature change should occur.

Further, due to the presence of a third hydrophobic spacing web (13, 113) it is able to transfer the sweat in liquid phase from the inside to the outside (transverse breathability) and to define a preferential passage for the sweat in vapor phase from the first web (11) to the outside (longitudinal breathability).

Moreover, the fabric structure (10) is able to achieve a thermal resistance of the fabric equal to 1.0 CLO with the presence of the first fleece (19) which is produced by brushing or napping of the fibers making up the continuous layer (18) of the second web (12).

Furthermore, it is found that, in the variant of the fabric structure (10) illustrated in FIG. 5, a thermal resistance of the fabric equal to 1.3 CLO is achieved, with the simultaneous presence of both the first fleece (19) and the second fleece (23), the latter being produced by brushing or napping of the fibers making up the plurality of stripes (16) of the first web (11).

As understood by one of ordinary skill in the art, the embodiments are susceptible of numerous modifications and variations, all of which are within the scope of the same inventive concepts.

The materials used as well as the dimensions making up the individual components of the embodiments can be more relevant according to the specific requirements. The characteristics indicated as being advantageous, desirable, or the like, can also be absent or replaced by equivalent ones.

It will thus be seen that the objects set forth above, and those made apparent from the preceding description, are efficiently attained, and since certain changes may be made in the constructions described above without departing from the spirit and scope of the disclosure, it is intended that all matter contained in this description shall be interpreted as illustrative and not in a limiting sense.

It is also to be understood that the following claims are intended to cover all of the generic and specific features of the embodiments described herein, and all statements of the scope of the disclosure, which come as a matter of language, might be said to fall therebetween. Furthermore, while a number of embodiments have been described, it nevertheless will be understood that various modifications may be made without departing from the spirit and scope of the disclosure.

The invention claimed is:

1. A three-dimensional knit spacer fabric having an upper surface and a lower surface, wherein the upper surface of the knit spacer fabric comprises a plurality of parallel channels and ribs, wherein the knit space fabric comprises:
    a first knit layer forming the upper surface of the three-dimensional knit spacer fabric structure, wherein the first layer comprises a plurality of parallel spaced apart fabric strips which form the ribs in the knit spacer fabric, wherein the fabric strips have a width of between about 2 and 6 millimeters, and wherein the first layer comprises a plurality of yarns that are napped forming a first fleece, wherein the plurality of yarns of the first layer comprise wool;
    a second knit layer forming the lower surface of the three-dimensional knit spacer fabric structure, wherein the second layer is a continuous fabric layer, and wherein the second layer comprises a plurality of yarns that are napped forming a second fleece, wherein the plurality of yarns of the second layer comprise wool; and,
    a spacing layer that interconnects the first knit layer and the second knit layer, wherein the interconnecting of the first layer and the second layer forming a plurality of parallel channels, wherein in a plane oriented substantially perpendicular to the plurality of ribs the channels of the spacing layer have a substantially "U" cross-section and the spacer layer has a plurality trapezoidal cross-section shape, wherein each trapezoidal cross-section shape comprises a plurality of pile yarns, wherein the top of each trapezoidal cross-section shape corresponds to the ribs in the first knit layer, wherein the channels have a width of between about 2 and 8 millimeters, and wherein the spacing layer has a thickness of between about 2 and 8 millimeters.

2. The three-dimensional knit spacer fabric of claim 1, wherein the spacer fabric comprises a first lay-in yarn and a second lay-in yarns, wherein at least one of the first lay-in yarn and the second lay-in yarn incorporates an elastomeric yarn.

3. The three-dimensional knit spacer fabric of claim 1, wherein
    the plurality of channels are configured to allow the transfer of warm humid air and/or sweat along the three-dimensional knit spacer fabric and toward the outside.

4. An article of footwear comprising the three-dimensional knit spacer fabric of claim 1.

5. An article of outerwear comprising the three-dimensional knit spacer fabric of claim 1.

6. The article of footwear according to claim 4,
    wherein the said plurality of channels configured to allow the transfer of warm humid air and/or sweat along the three-dimensional knit spacer fabric and toward the outside.

7. The three-dimensional knit spacer fabric of claim 1, wherein the fabric strips have a width of between about 3 and 4 millimeters.

8. The three-dimensional knit spacer fabric of claim 1, wherein the first and second layers of fleece increase the degree of insulation of the three-dimensional knit spacer fabric as compared to a three-dimensional knit spacer fabric without fleece layers.

\* \* \* \* \*